US012560912B2

(12) United States Patent
Matsuda et al.

(10) Patent No.: US 12,560,912 B2
(45) Date of Patent: Feb. 24, 2026

(54) INFORMATION PROCESSING DEVICE, INFORMATION PROCESSING METHOD, AND NON-TRANSITORY COMPUTER-READABLE RECORDING MEDIUM FOR SELECTING EQUIPMENT FOR USE IN A PLANT

(71) Applicant: Yokogawa Electric Corporation, Musashino (JP)

(72) Inventors: Takaaki Matsuda, Tokyo (JP); Shin Okuyama, Tokyo (JP); Hiroaki Nakajima, Tokyo (JP); Hiroaki Zushi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 397 days.

(21) Appl. No.: 18/113,660

(22) Filed: Feb. 24, 2023

(65) Prior Publication Data

US 2023/0315060 A1 Oct. 5, 2023

(30) Foreign Application Priority Data

Mar. 30, 2022 (JP) ................................ 2022-056288

(51) Int. Cl.
*G05B 19/418* (2006.01)

(52) U.S. Cl.
CPC .................. *G05B 19/41835* (2013.01); *G05B 2219/31449* (2013.01)

(58) Field of Classification Search
CPC .... G05B 19/41835; G05B 2219/31449; G05B 2219/31342; G05B 19/4188

USPC .......................................................... 700/28
See application file for complete search history.

(56) References Cited

U.S. PATENT DOCUMENTS

| | | | |
|---|---|---|---|
| 2012/0029661 A1* | 2/2012 | Jones ............... | G05B 19/41865 |
| | | | 700/17 |
| 2015/0193418 A1* | 7/2015 | Koska ..................... | H04L 67/10 |
| | | | 715/223 |
| 2015/0220080 A1* | 8/2015 | Nixon ................ | G05B 23/0264 |
| | | | 700/19 |
| 2017/0277175 A1* | 9/2017 | Yoshida ............. | G05B 23/0243 |
| | | (Continued) | |

FOREIGN PATENT DOCUMENTS

| | | |
|---|---|---|
| JP | 2002-7518 A | 1/2002 |
| JP | 2009-70200 A | 4/2009 |
| | (Continued) | |

OTHER PUBLICATIONS

Office Action dated Dec. 15, 2022, issued in counterpart JP application No. 2022-056288 with English translation. (6 pages).

*Primary Examiner* — Jigneshkumar C Patel
(74) *Attorney, Agent, or Firm* — WHDA, LLP

(57) ABSTRACT

An information processing device keeps a plurality of sets of designing information each on a combination of a plurality of plant devices that execute an operation a plant and at least one control device that executes control on each of the plant devices, keeps operational past records with respect to each combination of a plurality of plant devices and a control device, extracts combinations of a plurality of plant devices and a control device that meet a designing condition on the plant based on the designing information, and outputs the extracted combinations of a plurality of plant devices and a control device based on the operational past records.

9 Claims, 6 Drawing Sheets

(56)        References Cited

U.S. PATENT DOCUMENTS

| 2019/0064787 A1* | 2/2019 | Maturana | ........... | G05B 23/0227 |
| 2023/0091963 A1* | 3/2023 | Stump | ............. | G05B 19/41835 |
| | | | | 700/28 |

FOREIGN PATENT DOCUMENTS

| JP | 2012-79176 A | 4/2012 |
| JP | 2019-185641 A | 10/2019 |
| JP | 2021-51735 A | 4/2021 |
| JP | 2021-60993 A | 4/2021 |

* cited by examiner

| TYPE OF PLANT | TYPE OF OPERA-TION | CONTROL DEVICE | PLANT DEVICE |
|---|---|---|---|
| OIL REFINING | SEPARA-TION | CONTROLLER A | TANK a1, PIPE a2, PIPE a3, ··· |
| | | CONTROLLER B | TANK b1, PIPE b2, PIPE b3, ··· |
| | | CONTROLLER C | TANK c1, PIPE c2, PIPE c3, ··· |
| | DISTILLA-TION | CONTROLLER D | DISTILLATION COLUMN d1, TANK d2, PIPE d3, ··· |
| | | CONTROLLER E | DISTILLATION COLUMN e1, TANK e2, PIPE e3, ··· |
| | | CONTROLLER F | DISTILLATION COLUMN f1, TANK f2, PIPE f3, ··· |
| ··· | ··· | | ··· |

INFORMATION PROCESSING DEVICE, INFORMATION PROCESSING METHOD, AND NON-TRANSITORY COMPUTER-READABLE RECORDING MEDIUM FOR SELECTING EQUIPMENT FOR USE IN A PLANT

CROSS-REFERENCE TO RELATED APPLICATION

The present application claims priority to and incorporates by reference the entire contents of Japanese Patent Application No. 2022-056288 filed in Japan on Mar. 30, 2022.

FIELD

The present disclosure relates to an information processing device, an information processing method, and a computer-readable recording medium.

BACKGROUND

In systems that control each process of a plant ("process control system" as appropriate), there have been techniques of carrying out speedy tests on and making improvements in a control logic in the design phase and facilitating development of a process control system, modification, and trouble shooting. In process control systems, there also have been techniques of automatically selecting a program and parameters that are used in a system of subject or a device of subject to reduce human operational errors.

Patent Literature 1: Japanese Laid-open Patent Publication No. 2021-060993

Patent Literature 2: Japanese Laid-open Patent Publication No. 2021-051735

Patent Literature 3: Japanese Laid-open Patent Publication No. 2019-185641

In a recent plant, a large number of devices, such as devices that execute an operation in the plant ("plant devices" as appropriate) and a device that controls the plant devices ("control device" as appropriate, are used. Furthermore, there are a plurality of makers that manufacture these devices and there are a wide variety of use of the devices and optimum operation environments. The above-described conventional technique, however, has a difficulty in securing safety and selecting an optimum combination of devices to be used for a plant in short time.

SUMMARY

According to an aspect of the embodiments, an information processing device includes, a first storage unit that stores a plurality of sets of designing information each on a combination of a plurality of plant devices that execute an operation in a plant and at least one control device that executes control on each of the plant devices, a second storage unit that stores operational mast records with respect to each of the combinations, an extractor that extracts, based on the designing information, the combinations that meet a designing condition on the plant; and an output unit that outputs the extracted combinations based on the operational past records.

According to an aspect of the embodiments, an information processing method includes, keeping a plurality of sets of designing information each on a combination of a plurality of plant devices that execute an operation in a plant and at least one control device that executes control on each of the plant devices, keeping operational past records with respect to each of the combinations, extracting the combination that meet a designing condition on the plant based on the designing information, and outputting the extracted combinations based on the operational past records.

According to an aspect of the embodiments, a computer-readable recording medium having stored therein an information processing program that causes a commuter to execute a process includes, keeping a plurality of sets of designing information each on a combination of a plurality of plant devices that execute an operation in a plant and at least one control device that executes control on each of the plant devices, keeping operational past records with respect to each of the combinations, extracting the combinations that meet a designing condition on the plant based on the designing information, and outputting the extracted combinations based on the operational past records.

BRIEF DESCRIPTION OF THE DRAWINGS

FIG. 3 is a diagram illustrating an example of a designing information database according to the embodiment;

DESCRIPTION OF EMBODIMENTS

An information processing device, an information processing method, and a computer-readable recording medium according to an embodiment of the disclosure will be described in detail below with reference to the accompanying drawings. Note that the disclosure is not limited by the embodiment described below.

Embodiment

A configuration of an information processing system, configurations of an information processing device, etc., and a flow of processes according to the embodiment will be described below sequentially and effects of the embodiment will be described lastly.

Configuration of Information Processing System 100

Figure 1:
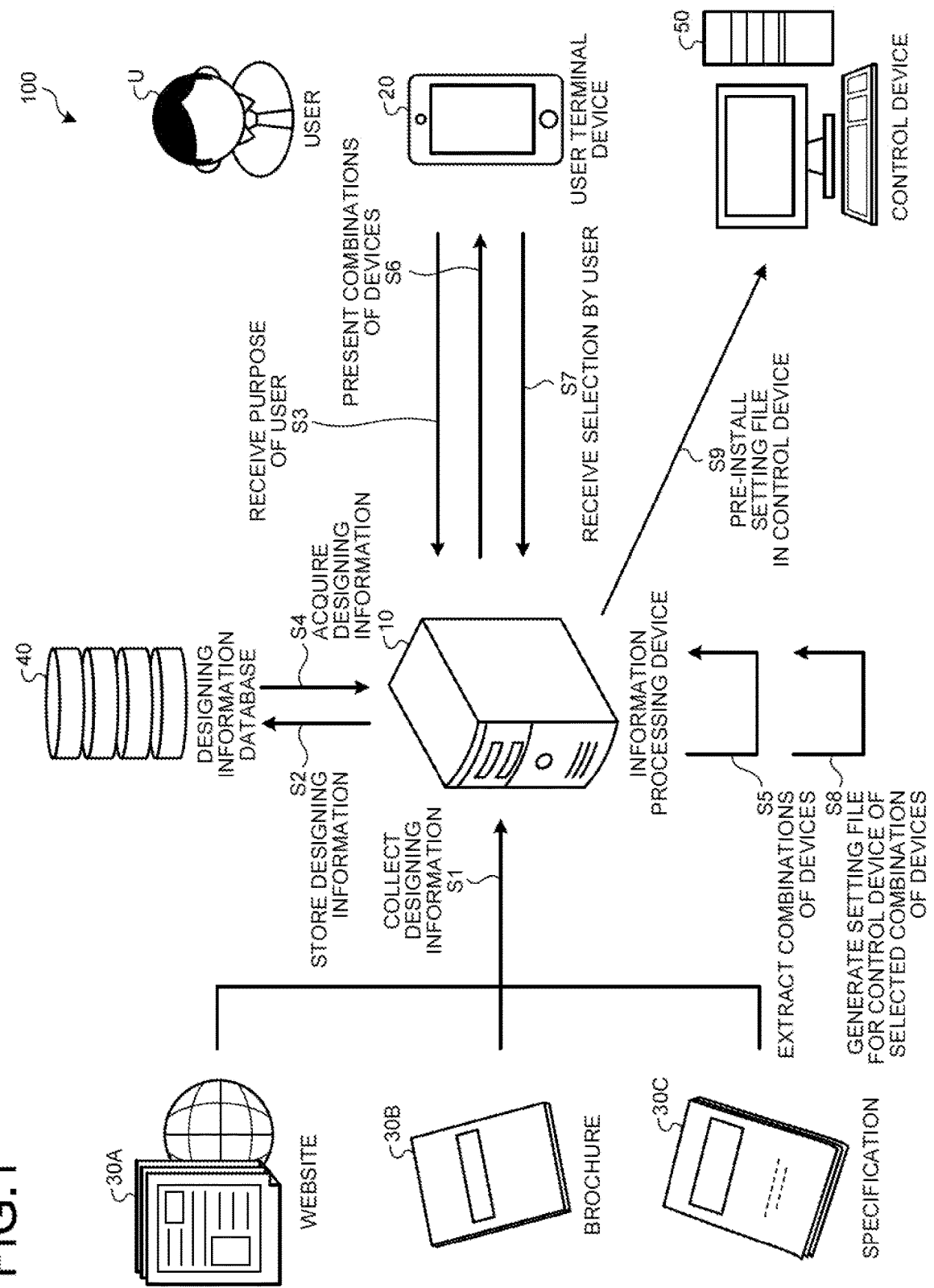
FIG. 1 is a diagram illustrating a configuration example of an information processing system according to an embodiment.

Using FIG. 1, a configuration of an information processing system 100 according to the embodiment will be described in detail. FIG. 1 is a diagram illustrating a configuration example of the information processing system 100 according to the embodiment. An entire configuration example of the information processing system 100, a process performed by the information processing system 100, and effects of the information processing system 100 will be described below sequentially.

1-1. Entire Configuration Example of Information Processing System 100

The information processing system 100 includes an information processing device 10, a user terminal device 20, a designing information provision source 30 (a website 30A, a brochure 30B and a specification 30C), a designing information database 40 and a control device 50. The information processing device 10, the user terminal device 20, the designing information provision source 30, the designing information database 40 and the control device 50 are connected by a wired or a wireless manner via a given communication network (not illustrated in the drawing) such that they can communicate with one another.

The information processing system 100 illustrated in FIG. 1 may include a plurality of the information processing devices 10, a plurality of the user terminal devices 20 or a plurality of the designing information databases 40. The information processing device 10 may be configured by being integrated with the designing information database 40.

1-2. Entire Process performed by Information Processing System 100

An entire process performed by the information processing system 100 will be described. Note that Steps S1 to S9 described below can also be executed in a different order. There may be a process to be omitted among steps S1 to S9 described below.

1-2-1. Process of Step S1

First of all, the information processing device 10 collects designing information from the website 30A, the brochure 30B and the specification 30C that are the designing information provision source 30, or the like (step S1). The designing information is information on designing a plant and is information on combinations of plant devices and control devices. A plant device is a device aimed at execution of an operation in a plant ("plant operation" as appropriate) and is a tank, pipes, or the like, of each maker. A control device is a device that configures a plant control system and that has a function of controlling plant devices and is a controller, a personal computer (PC), a signal converter, a sensor with a control function, or the like, of each maker.

1-2-2. Process of Step S2

Secondly, the information processing device 10 stores the collected designing information in the designing information database 40 (step S2). For example, the information processing device 10 stores the collected designing information on each maker with respect to each type of plant, such as "oil refinery plant" or "pharmaceutical purification plant".

1-2-3. Process of Step S3

Thirdly, the information processing device 10 receives a purpose of a user U from the user terminal device 20 of the user U (step S3). The purpose that the information processing device 10 receives is a requested purpose of the user U in purchasing plant devices and control devices and is a purpose of executing plant operations. For example, the information processing device 10 receives conditions on designing the plant, such as a type of plant (for example, oil refining, naphtha cracking, liquefied natural gas, iron making, pulp and paper, cement, service water and sewage treatment, thermal power generation, or copper refining) and types of operation (for example, separation, distillation, extraction, gas absorption, adsorption, membrane separation, drying, and heating) serving as parts of the plant. The information processing device 10 may receive conditions on designing the plant, such as new establishment, additional establishment, or maintenance of the plant, from the user terminal device 20.

1-2-4. Process of Step S4

Fourthly, the information processing device 10 acquires the designing information from the designing information database 40 (step S4). For example, when "oil refining" is received from the user terminal device 20 as the purpose of the user U, the information processing device 10 acquires the designing information on each maker with respect to an oil refinery plant.

1-2-5. Process of Step 5

Fifthly, the information processing device 10 extracts combinations of devices suitable for the purpose of the user U from the acquired designing information (step S5) For example, when "oil refining" is received from the user terminal device 20 as the purpose of the user U, the information processing device 10 extracts combinations of plant devices and control devices with respect to an oil refining.

1-2-6. Process of Step 6

Sixthly, the information processing device 10 presents combinations of devices of which operational past records exist among the extracted combinations to the user U (step S6). The operational past records are past records on each device and each plant that were designed in the past for plant operations and are past records on destinations of delivery of each device, past records on operation of each plant, past records on a source of delivery of each device, etc. The past records on destinations of delivery of each device are on the amount of delivery of each device, the term of delivery, the place of delivery (the area or the number of countries), the customer, the scale, the work period and price, the standards, options (special techniques or special services), etc. The past records on operation of each plant are on the number of plants in operation and the term of operation, the number of times maintenance is performed and the term and the cost of maintenance, the number of failures, the number of accidents, the number of times an action is taken in an emergency, the term of recovery, etc. The past records on the source of delivery of each device is on the financial status of the source of delivery of each device, the history of troubles, etc.

The information processing device 10 displays a plurality of combinations of plant deices and control devices that meet given operational past records on a display screen of the user terminal device 20 of the user U. When a condition on operational past records, such as "in a descending n order with respect to the amount of operational past records", is designated as a display condition, the information processing device 10 presents a plurality of combinations of devices to comply with the designation. Note that a specific example of the display screen presented by the information processing device 10 will be described below.

1-2-7. Process of Step S7

Seventhly, the information processing device 10 receives the selection by the user U from the user terminal device 20 (step S7). For example, the information processing device 10 receives the combination of devices that is selected by the user U on the user terminal device 20 from among the combinations of devices that are displayed on the display screen of the user terminal device 20 of the user U.

1-2-8. Process of Step 28

Eighthly, the information processing device 10 generates a setting file (configuration file) for the control device 50 of the combination that is selected v the user U (step S8). The setting file is a file to be installed in a controller, or the like, that configures a plant control system and that has a control function and is a file containing information necessary to enable execution of a process of communication between devices in the plant, arithmetic processing by each device, and a process of display by each device. The information contained in the setting file is a communication address, a communication method (driver), a signal type, communication data, an abnormality diagnosis, an operation in abnormality, message generation standards, a control method, a control variable, a screen configuration, screen expansion, colors, a language, etc. For example, the information processing device 10 generates a setting file for making network connection settings (an IP (Internet Protocol) address setting, a domain setting, a security setting, a protocol setting, etc.)

1-2-9. Process of Step S9

Ninthly, the information processing device 10 pre-installs the generated setting file in the control device 50 (step S9). The information processing device 10 may transmit the generated setting file to a manager terminal device (not illustrated in the drawing) of the maker of the control device 50. The information processing device 10 may instruct the above-described manager terminal device of the maker of the control device 50 to deliver the control device 50 and the plant devices to the user U.

1-3. Effects of Information Processing System 100

After describing problems in reference techniques 1 to 3 with respect to settings by the plant control system will be described below and then effects of the information processing system 100 will be described.

Problem in Reference Technique 1

The reference technique 1 is a technique enabling a fast test on and an improvement in a control logic at a stage of designing and includes a user interface (UI) device with a setting function and a simulation function of a control module (for example, refer to Patent Literature 1). The reference technique 1 enables designing, testing and previewing before downloading the control logic in a configuration database or a process controller. Furthermore, the reference technique 1 makes it possible to, separating tests on the controller configuration in a logic mode and a non-logic mode (the usage of resources and the run time) from each other, complete designing the control logic before downloading the configuration into the controller. On the other hand, the reference technique 1 has a problem in that time-consuming iterative process of deigning, downloading into the database, propagation to a live controller, and a test in a physical controller is necessary.

1-3-2. Problem in Reference Technique 2

The reference technique 2 is a technique that facilitates development, modification, and trouble shooting in a process control system (for example, refer to Patent Literature 2). The reference technique 2 makes it possible to ensure separateness and portability because of encapsulation of services. The reference technique 2 also makes it possible to ensure synchronousness because of integration of an external engine functional block. On the other hand, the reference technique 2 has the following problem.

First of all, a process control system is complicated and contains a large number of software components and interdependency among the software components tend to increase as the time passes. The reference technique 2 does not enable a component to be changed independently without taking a large number of other software components into consideration.

In the reference technique 2, coupling custom calculations and an algorithm execution engine that cannot be implemented in a control system platform depends on an external interface protocol (Modbus, Modbus/TCP (Transmission Control Protocol), Ethernet (trademark)/IP, OPC (Open Platform Communications), OPC-UA (Unified Architecture), TEC (International Electrotechnical Communication) 6185, or the like), which is associated with complication and instability.

1-3-3. Problem in Reference Technique 3

The reference technique 3 is a technique of, according to the background that it is necessary to select and set enormous programs and parameters in order to control a wide variety of plants by a single model, automatically choosing programs and parameters that are used in a system of subject and a device of subject to reduce human operational errors (for example, refer to Patent Literature 3). On the other hand, the reference technique 3 has the following problem.

First of all, the reference technique 3 only clarifies part of information that is used for automatic selection, the content of programs and parameters are unclear, and a logic or automatic selection is not described.

According to the reference technique 3, programs and parameters that can be automatically selected according to only process control system information and device information are restrictive and an effect that human operational errors are reduced is not much expected.

1-3-4. Overview

In light of the above-described reference techniques, an overview of the information processing system 100 according to the embodiment will be described. As for plant control systems, one system used to be delivered per company; however, in recent years, multivendor systems are accelerating. Settings in network connection of multivendor systems however differ in the method and specification from maker to maker, which is inefficient.

The information processing system 100 keeps designing information on a combination of a plurality of plant devices and a control device, keeps operational past records with respect to each combinations of devices, receives at least one of a type of plant and a type of operation as a designing condition, extracts combinations of devices that meet the designing condition on the plant based on the designing information, and outputs the extracted combinations of devices based on the operational past records. The information processing system 100 also generates a setting file for the control device 50 that is contained in the combination of devices that the user U selects.

1-3-5. Effect

The information processing system 100 thus makes it possible to realize an electronic commerce (EC) site that extracts combinations of plant devices and control devices from multiple vendors of which operational past records exist, that generates a configuration file for making a network connection setting for the control devices of the combinations and pre-installs the configuration file in the control device, and that then arranges delivery of the control device.

It is usual that there are tens of thousands of control devices and plant devices in a plant and the above-described EC site enables the user U to make a purchase without selecting control devices and plant devices one by one.

In the above-described EC site, it is also possible display the extracted combinations in a descending order with respect to the amount of operational past records, cause the user U to select a requested combination, and thus accept a purchase and it is also possible use a sort function of rearranging the extracted combinations from a point of view that is requested by the user U (in a descending order with respect to the amount of operational past records, in an ascending order with respect to the time of operational past records, in a descending order with respect to the evaluation, or the like). In other words, the information processing system 100 makes it possible to execute an extracting process or an outputting process according to the operational past records and the purpose of the user U, select an appropriate combination from an enormous number of control devices and plant devices, and present the combination to the user U fast.

In the above-described EC site, it is also possible to cause the user U to select also a maker to extract combinations of plant devices and control devices of the maker of which operational past records exist and also cause the user U to select requirements (explosion proofing, ship class, communication standards, etc.,) to extract combinations of plant devices and control devices of the maker that meets the requirements and of which operational past records exist. In other words, the information processing system 100 can present not only combinations of devices to the user U fast but also combinations of devices corresponding to a plant that the user U requests.

Furthermore, the above-described EC site also makes it possible to arrange for an operational staff who has an experience with respect to a combination that is selected by the user U. In the above-described EC site, it is also possible to use an evaluation function of causing the user U to make an evaluation on a combination that is purchased by the user U and showing the evaluation to other users. In the above-described EC site, it is also possible to generate a configuration file for making data settings (such as settings on which value in the plant is to be monitored, on what monitor period it is, on an alert threshold, etc.,) and pre-install the configuration file. In other words, in the information processing system 100, it is possible to not only present combinations of devices to the user U but also realize supports after purchase of devices effectively.

As described above, in the information processing system 100, it is possible to, while securing operational past records of combinations of plant devices and control devices, easily execute settings in the control device, such as a network connection setting in the control device.

2. Configuration of Information Processing Device 10

Figure 4:
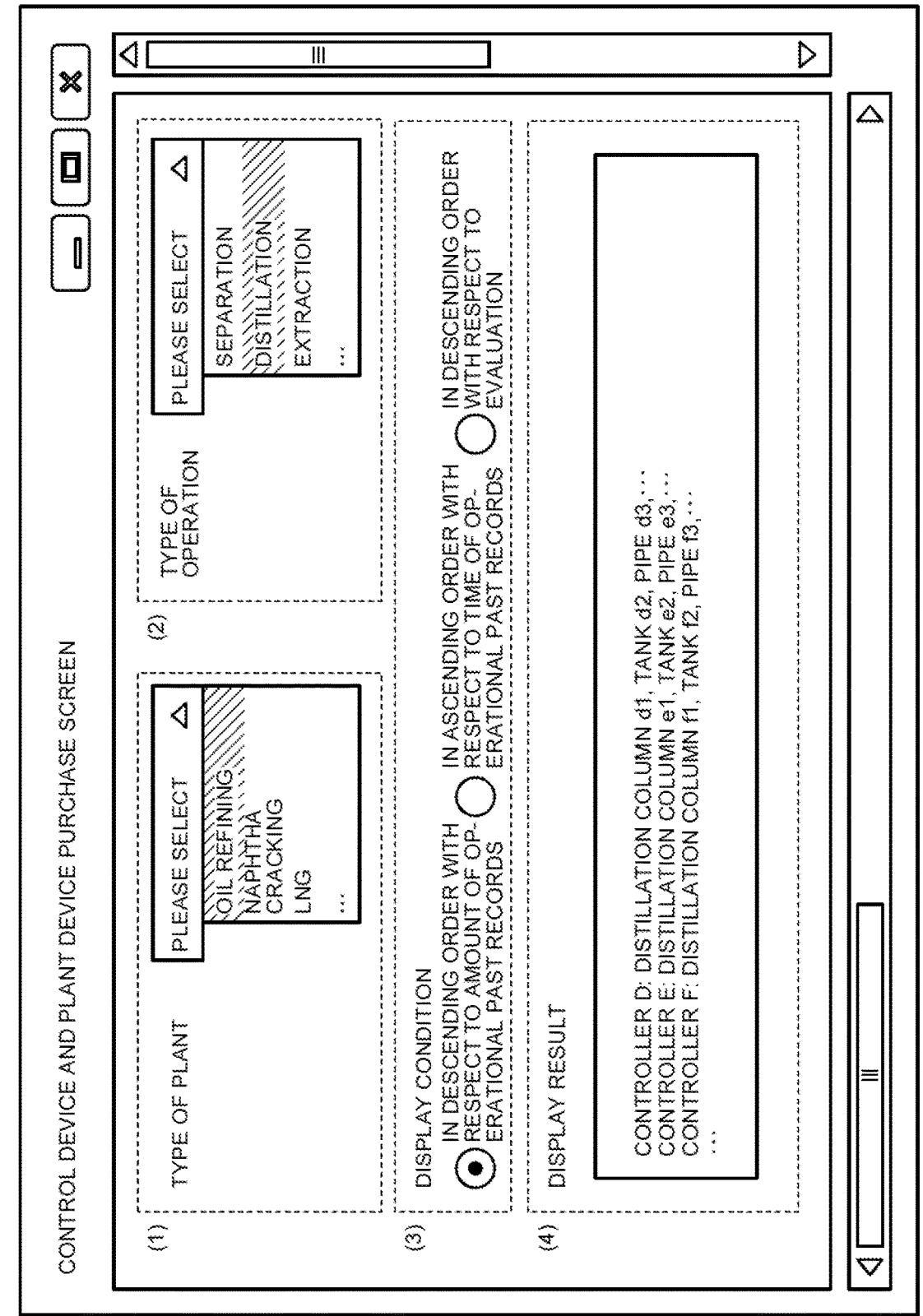
FIG. 4 is a diagram illustrating an example of a display screen according to the embodiment.

Using FIGS. 2 to 4, functional configurations of the respective devices that the information processing system 100 illustrated in FIG. 1 includes will be described. A configuration example of the information processing device 10 according to the embodiment, a specific example of the designing information database 40, and a specific example of the display screen according to the embodiment will be described in detail below.

2-1. Configuration Example of Information Processing Device 10

First of all, using FIG. 2, the configuration example of the information processing device 10 illustrated in FIG. 1 will be described. FIG. 2 is a block diagram illustrating the configuration example of the information processing device 10 according to the embodiment. The information processing device 10 includes an input unit 11, display unit 12, a communication unit 13, a storage unit 14 and a controller 15.

2-1-1. Input Unit 11

The input unit 11 is in charge of inputs of various types or information to the information processing device 10. For example, the input unit 11 is realized using mouse and a keyboard, etc., and receives an input of setting information, or the like, to the information processing device 10.

2-1-2. Display Unit 12

The display unit 12 is in charge of display of various types of information from the information processing device 10. For example, the display unit 12 is realized using a display, etc., and displays the setting information, or the like, that is stored in the information processing device 10.

2-1-3. Communication Unit 13

The communication unit 13 is in charge of data communication with other devices. For example, the communication unit 13 performs data communication with each communication device via a router, or the like. The communication unit 13 is capable of data communication with an operator terminal device (not illustrated in the drawing).

2-1-4. Storage Unit 14

The storage unit 14 stores various types of information to which the controller 15 refers when operating and various types of information that are acquired when the controller 15 operates. The storage unit 14 includes a setting condition storage unit 14a, an operational past record storage unit 14b, and a setting file storage unit 14c. The storage unit 14 is realized using, for example, a random access memory (RAM), a semiconductor memory device, such as a flash memory, a storage device, such as a hard disk or an optical disk, or the like. Note that, in the example illustrated in FIG. 2, the storage unit 14 is set in the information processing device 10; however, the storage unit 14 may be set outside the information processing device 10 and a plurality of storage units may be set.

2-1-4-1. Setting condition Storage Unit 14a

The setting condition storage unit 14a stores designing conditions (a type of plant, a type of operation, etc.,) on plants that are presented to the user U and a designing condition (purpose of the user U) on a plant that is selected by the user U. For example, the setting condition storage unit 14a stores, as the type of plant, "oil refining", "naphtha cracking", "liquefied natural gas (LNG)", "iron making", "pulp and paper", "cement", "service water and sewage treatment", "thermal power generation", "copper refining", or the like. The setting condition storage unit 14a stores, as the type of operation, "separation", "distillation", "extraction", "gas absorption", "adsorption", "membrane separation", "drying", "heating", or the like.

2-1-4-2. Operational Past Record Storage Unit 14b

The operational past record storage unit 14b stores operational past records with respect to each combination of a plurality of plant devices that execute an operation in a plant and at least one control device that executes control on each of the plant devices. For example, the operational past record storage unit 14b stores past records that are on each device and each plant designed in the past for plant operations and that are past records on destinations of delivery of each device, past records on operation of each plant, past records on a source of delivery of each device, etc. The operational past record storage unit 14b stores, as the past records on destinations of delivery of each device, the amount of delivery of each device, the term of delivery, the place of delivery (the area or the number of countries), the customer, the scale, the work period and price, the standards, options (special techniques or special services), etc. The operational past record storage unit 14b stores, as the past records on operation of each plant, the number of plants n operation, the term of operation, the number of times maintenance is made and the term and the cost of maintenance, the number of failures, the number of accidents, the number of tines an action is taken in an emergency, the term of recovery, etc. The operational past record storage unit 14b stores, as the past records on the source of delivery of each device, the financial status of the source of delivery of each device, the history of troubles, etc.

2-1-4-3. Setting File Storage Unit 14c

The settings file storage unit 14c stores a setting file for the control device 50 that is generated by a generator 15e of the controller 15 to be described below. For example, the setting file storage unit 14*c* stores a setting file containing information necessary to enable execution of a process of communication between devices in the plant, arithmetic processing by each device, and a process of display by each device. The setting file storage unit 14*c* stores, as the information necessary to enable execution of the process of communication between devices in the plant, a communication address, a communication method (driver), a signal type, communication data, etc. The setting file storage unit 14*c* stores, as the information necessary to enable execution of the arithmetic processing by each device in the plant, an abnormality diagnosis, an operation in abnormality, message generation standards, a control method, a control variable, etc. The setting file storage unit 14*c* stores, as the information necessary to enable execution of the process of display by each device in the plant, a screen configuration, screen expansion, colors, a language, etc.

2-1-5. Controller 15

The controller 15 is in charge of control on the entire information processing device 10. The controller 15 includes a collector 15*a*, a receiver 15*b*, an extractor 15*c*, an output unit 15*d*, and the generator 15*e*. The controller 15 can be realized using, for example an electronic circuit, such as a central processing unit (CPU) or a micro processing unit (MPU), or an integrated circuit, such as an application specific integrated circuit (ASIC) or a field programmable gate array (FPGA).

2-1-5-1. Collector 15*a*

The collector 15*a* collects designing information from a website, a brochure or a specification of a source of delivery of a plant device or a control device and stores the designing information in the designing information database 40. For example, the collector 15*a* collects combinations of plant devices with respect to control devices that are delivered to an "oil refinery plant" or a "pharmaceutical purification plant" from a website from maker of a plant device or a control device.

The collector 15*a* collects combinations of plant devices, such as a tank, pipes, a reactor, a distillation column, a furnace and a heat exchanger, and control devices, such as a controller, a communication device, an operation monitoring device and various types of sensors. The collector 15*a* may collect not only the designing information on combinations of plant devices and control devices but also operational past records of each device. For example, the collector 15*a* is also able to collect operational past records on the amount of delivery of each device, the term of delivery, the place of delivery (the area or the number of countries), etc.

2-1-5-2. Receiver 15*b*

The receiver 15*b* receives at least one of a type of plant and a type of operation as a designing condition from the user. The receiver 15*b* also receives a type of plant and a type of operation as a designing condition from the user. For example, the receiver 15*b* receives, as the type of plant, "oil refining", "naphtha cracking", "LNG", "iron making", "pulp and paper", "cement", "service water and sewage treatment", "thermal power generation", "copper refining", or the like, from the user. The receiver 15*b* receives, as the type of operation, "separation", "distillation", "extraction", "gas absorption", "adsorption", "membrane separation", "drying", "heating", or the like, from the user.

The receiver 15*b* receives a designation by the user U on a display screen that is output by the output unit 15*d* to the user terminal device 20. For example, the receiver 15*b* receives, as a display condition, a designation by the user U that is selecting an order of display of display results, such as "in a descending order with respect to the amount or operational past records", "in an ascending order with respect to the time of operational past records", or "in a descending order with respect to the evaluation". The receiver 15*b* also receives a designation of a combination of devices to be purchased by the user U from among possible combinations of devices that are displayed on the display screen.

2-1-5-3. Extractor 15*c*

Based on the designing information, the extractor 15*c* extracts combinations of plant devices and control devices that meet the designing conditions on the plant. For example, the extractor 15*c* extracts combinations of plant devices and control devices that meet the designing conditions from the designing information that the designing information database 40 stores. This will be described using a specific example. When the user U designates a type of plant "oil refinery plant" and a type or operation "distillation", the extractor 15*c* extracts combinations of devices, such as a control device "Controller D" and plant devices "Distillation column d1, Tank d2, Pipe d3, . . . ", etc.

2-1-5-4. Output Unit 15*d*

The output unit 15*d* outputs the extracted combinations of plant devices and control devices based on the operational past records. For example, the output unit 15*d* calculates score values of the extracted combinations of plant devices and control devices, using at least one of past records on the destination of delivery of each device, past records on operation of each plant, and past records on a source of delivery of each device as the operational past records, and outputs combinations whose score values are equal to or larger than a given value.

The output unit 15*d* calculates a score value of each item using, as the past records on the destinations of delivery of each device, the amount of delivery of each device, the term of delivery, the place of delivery (the area or the number of countries), the customer, the scale, the work period and price, the standards, options (special techniques or special services), etc., and outputs combinations of devices whose score values are equal to or larger than a given value. The output unit 15*d* also calculates a score value of each item using, as the past records on operation of each plant, the number of plants in operation, the term of operation, the number of times maintenance is performed and the term and the cost of maintenance, the number of failures, the number of accidents, the number of times an action is taken in an emergency, the term of recovery, etc., and outputs combinations of devices whose score values are equal to or larger than a given value. The output unit 15*d* also calculates a score value or each item using, as the past records on a source of delivery of each device, the financial status of the source of delivery of each device, the history of troubles, etc., and outputs combinations of devices whose score values are equal to or larger than a given value.

This will be described using a specific example. The output unit 15*d* extracts the top 10 controllers that are the first "Controller A", the second "Controller B", the third "Controller C", . . . , in a descending order with respect to the amount of delivery of controllers that are used for oil refinery plants and calculates score values corresponding to the order, such as "10" as the score value of "Controller A", "9" as the score value of "Controller B", "8" as the score value of "Controller C", . . . . The output unit 15*d* also extracts the top 10 plants that are the first "Plant A", the second "Plant B", the third "Plant C", . . . , in an ascending order with respect to the number of failures and the number of accidents in oil refinery plants and calculates score values corresponding to the order, such as "10" as the score value of "Plant A", "9" as the score value of "Plant B", "8" as the score value of "Plant C", . . . .

Note that the output unit 15d may calculate an average of score values with respect to each of given sections of operational past records (for example, the destinations of delivery, operation, the sources of delivery) or may weight each item and then calculate score values. The output unit 15d acquires the operational past records from the operational past record storage unit 14b.

The output unit 15d outputs the extracted combinations of plant devices and control devices in a descending order with respect to the amount of operational past records, in an ascending order with respect to the time of operational past records, or in a descending order with respect to the evaluation on operational past records. For example, when the user U designates "in a descending order with respect to the amount of operational past records" as the display condition, the output unit 15d makes outputs from the combination of device of which delivery is in the largest amount or the combination of devices whose corresponding number of plants in operation is the largest to the display screen of the user terminal device 20. When the user U designates "in an ascending order with respect to the time of operational past records" as the display condition, the output unit 15d makes outputs from the combination of devices of which term of delivery is the longest or the combination of devices whose corresponding term in which plants are in operation is the longest to the display screen of the user terminal device 20. When the user U designates "in a descending order with respect to the evaluation" as the display condition, the output unit 15d makes outputs from the combination of devices whose evaluation value is the highest among combinations of devices to which evaluation values are assigned by users who purchased the devices to the display screen of the user terminal device 20.

2-1-5-5. Generator 15e

The generator 15e generates, as a setting file for a control device contained in a combination that is selected the user from among the combinations of plant devices and control devices that are output, a setting file containing information enabling execution of at least one of communication, arithmetic processing, and display performed by a plant device or the control device in a plant. For example, the generator 15e generates, s the information necessary to enable execution of the process of communication between devices in the plant, a communication address, a communication method (driver), a signal type, communication data, etc. The generator 15e also generates, as the information necessary to enable execution of the arithmetic processing by each device in the plant, an abnormality diagnosis, an operation in abnormality, message generation standards, a control method, a control variable, etc. The generator 15e generates, as the information necessary to enable execution of the process of display by each device in the plant, a screen configuration, screen expansion, colors, a language, etc.

The generator 15e may sets (pre-installs) the generated setting file in the control device that is selected by the user U before delivery. The generator 15e may transmit the generated setting file to a manager terminal device (not illustrated in the drawing) of the maker of the control device 50. The generator 15e may instruct the manager terminal device (not illustrated in the drawing) of the maker of the control device 50 to deliver the control device 50 and the plant devices to the user U. Note that the generator 15e stores the generated setting file in the setting file storage unit 14c.

2-2. Specific Example of Designing Information Database 40

Using FIG. 3, an example of the designing information database 40 illustrated in FIG. 1 will be described. FIG. 3 is a diagram illustrating an example of the designing information database 40 according to the embodiment. The designing information database 40 stores a plurality of sets of designing information each on a plurality of plant devices that execute an operation in a plant and at least one control device that executes control on each of the plant devices. For example, the designing information database 40 stores designing information with respect to each of items, such as "type of plant", "type of operation", "control device" and "plant device". The designing information database 40 may store designing information with respect to each of the makers of control devices and plant devices. A specific example of the designing will be described below with respect to each of the items illustrated in FIG. 3.

2-2-1. Type of Plant

The designing information database 40 stores designing information with respect to each "plant type". For example, as illustrated in FIG. 3, the designing information database 40 stores designing information with respect to "oil refining" serving as a "plant type". Furthermore, the designing information database 40 may store designing information with respect to each of items, such as "naphtha cracking", "LNG", "iron making", "pulp and paper", "cement", "service water and sewage treatment", "thermal power generation" and "copper refining", serving as a "plant type".

2-2-2. Type of Operation

The designing information database 40 stores designing information with respect to each "type of operation" corresponding to "type of plant". For example, as illustrated in FIG. 3, the designing information database 40 stores designing information with respect to each of "separation" and "distillation" serving as a "type of operation". The designing information database 40 may store designing information with respect to each of items, such as "extraction", "gas absorption", "adsorption", "membrane separation", "drying", and "heating", serving as a "type of operation".

2-3 Control Device

The designing information database 40 stores designing information with respect to each "control device" corresponding to "type of operation". For example, as illustrated in FIG. 3, the designing information database 40 stores designing information with respect to each of "Controller A", "Controller B" and "Controller C" serving as a "control device" corresponding to "separation". The designing information database 40 also stores designing information with respect to each of "Controller D", "Controller E" and "Controller F" serving as a "control device" corresponding to "distillation".

2-2-4. Plant Device

The designing information database 40 stores designing information on "plant devices" corresponding to the "control device". For example, as illustrated in FIG. 3, the designing formation database 40 stores designing information on "Tank a1, Pipe a2, Pipe a3, . . . " serving as "plant devices" corresponding to "Controller A", on "Tank b1, Pipe b2, Pipe b23, . . . " serving as "plant devices" corresponding to "Controller B", and on "Tank c1, Pipe c2, Pipe c3, . . . " serving as "plant devices" corresponding to "Controller C" The designing information database 40 stores designing information on "Distillation column d1, Tank d2, Pipe d3, . . . " serving as "plant devices" corresponding to "Controller D", on "Distillation column e1, Tank e2, Pipe e3, . . . " serving as "plant devices" corresponding to "Controller E", and on "Distillation column f1, Tank f2, Pipe f3, . . . " serving as "plant devices" corresponding to "Controller F".

2-3. Specific Example of Display Screen

Using FIG. 4, a specific example of the display screen that the output unit 15*d* of the information processing device 10 outputs to the user terminal device 20 will be described. FIG. 4 is a diagram illustrating a specific example of the display screen according to the embodiment. The type of plant, the type of operation, the display condition, and the display results will be described below in this order.

2-3-1. Type of Plant

Using FIG. 4(1), display screen for the type of plant that is the designing condition (purpose) that the user U selects will be described. For example, the display screen for the type of plant displays a drop-down list presenting possible types of plant to be selected, such as "oil refining", "naphtha cracking" and "LNG", together with a display of "Please select", or the like. In the example in FIG. 4(1), "oil refining" (the slashed portion) is selected according to an operation by the user U.

2-3-2. Type of Operation

Using FIG. 4(2), a display screen for the type of operation that is the designing condition (purpose) that the user U selects will be described. For example, the display screen for the type of operation displays a drop-down list presenting possible types of operation to be selected, such as "separation", "distillation" and "extraction", together with a display of "Please select", or the like. In the example in FIG. 4(2), "distillation" (the slashed portion) is selected according to an operation by the user U. The display screen for the type of operation may display only types of operation corresponding to the type of plant that is selected by the user U.

2-3-3. Display Condition

Using FIG. 4(3), a display screen for the display condition for sorting the display results presented to the user U will be described. For example, the display screen for the display condition displays radio buttons enabling selection of a display condition together with a display of "in a descending order with respect to the amount of operational past records", "In an ascending order with respect to the time of operational past records", and "In a descending order with respect to the evaluation". In the example in FIG. 4(3), "a descending order with respect to the amount of operational past records" is selected according to an operation by the user U.

2-3-4 Display Results

Using FIG. 4(4), a display screen for the display results that are possible combinations of devices presented to the user U will be described. For example, the display screen for the display results displays combinations of plant devices and control devices, such as "Controller D: Distillation column d1, Tank d2, Pipe d3, . . . ", "Controller E: Distillation column e1, Tank e2, Pipe e3, . . . ", and "Controller F: Distillation column f1, Tank f2, Pipe f3, . . . ". In the example in FIG. 4(4), possible combinations that meet the conditions that are the type of plant "oil refining", the type of operation "distillation" and the display condition "in a descending order with respect no the amount of operational past records" are displayed.

3. Flow of Process performed by Information Processing System 100

Figure 5:
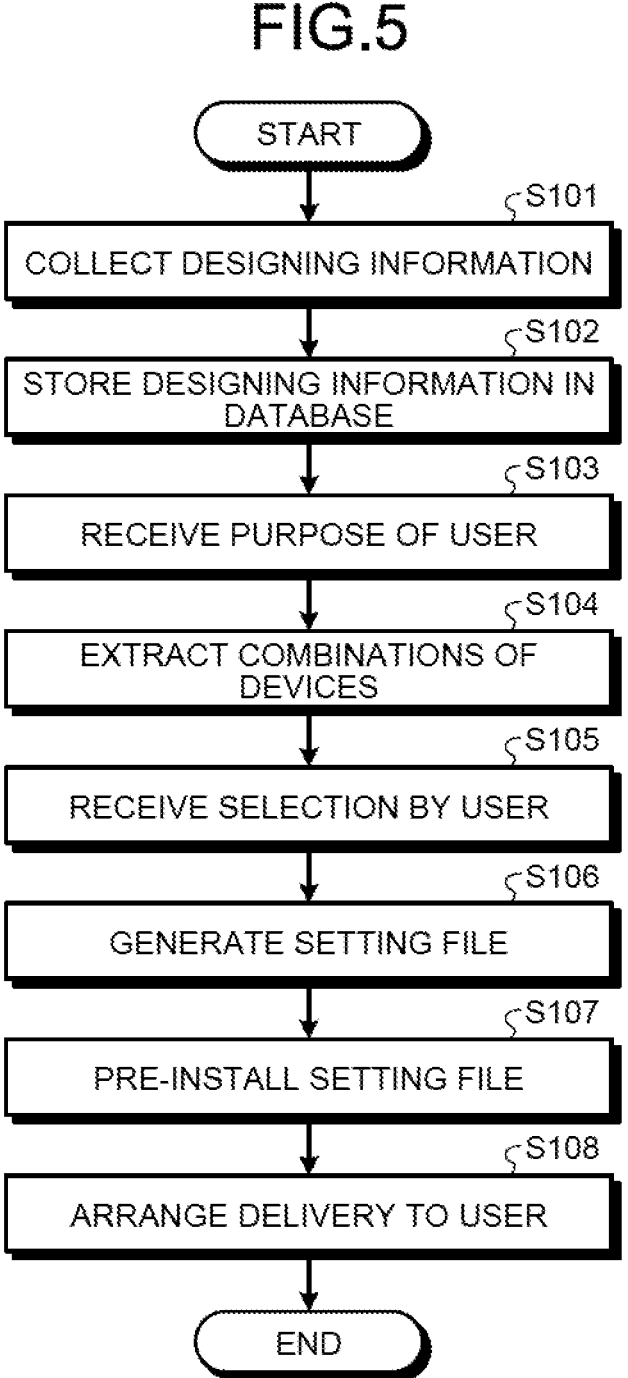
FIG. 5 is a flowchart illustrating an example of a flow of information processing according to the embodiment.

Using FIG. 5, a flow of the process performed by the information processing system 100 according to the embodiment will be described. FIG. 5 is a flowchart illustrating an example of an information processing according to the embodiment. Note that the processes of steps S101 to S108 described below are executable in a different order. There may be a process to be omitted among the processes of steps S101 to S108.

3-1. Process of step S101

First of all, the information processing device 10 collects designing information (step S101). For example, the information processing device 10 collects designing information from the website 30A, the brochure 30B and the specification 30C that are the designing information provision source 30, or the like (step 31).

3-2. Process of step S102

Secondly, the information processing device 10 stores the designing information in the database (step S102). For example, the information processing device 10 stores the collected designing information in the designing information database 40.

3-3. Process or step S103

Thirdly, the information processing device 10 receives a purpose of the user U (step S103). For example, the information processing device 10 receives a purpose of the user U from the user terminal device 20 of the user U.

3-4. Process or step S104

Fourthly, the information processing device 10 extracts combinations of devices (step S104). For example, the information processing device 10 acquires the designing information from the designing information database 40, extracts combinations of devices suitable for the purpose the user U from the acquired designing information, and presents combinations of devices of which operational past records exist among the extracted combinations to the user U.

3-5. Process of step S105

Fifthly, the information processing device 10 receives selection by the user U (step S105). For example, the information processing device 10 receives a combination of devices that is selected by the user U on the user terminal device 20 from among a plurality of combinations of devices that are displayed on the display screen of the user terminal device 20 of the user U.

3-6. Process of step S106

Sixthly, the information processing device 10 generates a setting file (step S106). For example, the information processing device 10 generates a setting file for network connection of the control device 50 of the combination of devices that is selected by the user U.

3-7. Process of step S107

Seventhly, the information processing device 10 pre-installs the setting file (step S107). For example, the information processing device 10 pre-installs the setting file for network connection of the control device 50 of the combination of devices that is selected by the user U.

3-8. Process of step S108

Eighthly, the information processing device 10 arranges delivery to the user U (step S108). For example, the information processing device 10 arranges delivery of the control device 50 with the setting file being pre-installed therein and the plant devices that are controlled by the control device 50 to the user U.

4. Effects of Embodiment

Effects of the embodiment will be described lastly. Effects 1 to 6 corresponding to the processes according to the embodiment will be described below.

4-1. Effect 1

First of all, the above-described processes according to the embodiment keeps designing information on a combination of a plurality of plant devices and a control device that executes control on the plant devices, keeps operational past records with respect to each or combinations of plant devices and the control devices, extracts combinations of plant devices and control devices that meet a design condition on a plant based on the designing information, and outputs the extracted combinations of plant devices and control devices based on the operational past records. For this reason, the processes according to the embodiment make it possible to easily select a setting for the control device in the plant.

4-2. Effect 2

Secondly, the above-described processes according to the embodiment receives at least one of a type of plant and a type of operation as a designing condition from the user U. The above-described processes according to the embodiment also receives a type of plant and a type of operation as a designing condition from the user U. Thus, the processes according to the embodiment makes it possible to easily select a setting for a control device in a plant according to a purpose of the user U.

4-3. Effect 3

Thirdly, the above-described processes according to the embodiment collects designing information from the website 30A, the brochure 30B or the specification 30C of a source of delivery or a plant device or a control device, keeps the designing information, and extracts combinations of plant devise and control devices that meet a designing condition from the designing information that is kept. The processes according to the embodiment thus make it possible to easily select a setting for a control device in a plant by collecting information of a source of delivery of each device.

4-4. Effect 4

Fourthly, the above-described processes according to the embodiment generates, as a setting file for the control device 50 contained in a combination of plant devices and the control device that is selected by the user U from among the output combinations of plant devices and control devices, a file containing information that enables execution of at least one of communication between devices in a plant, arithmetic processing by each device, and display performed by each device. The processes according to the embodiment thus make it possible to easily execute a setting for control device in a plant by generating a setting file for the control device that is selected by the user U 4-5. Effect 5

Fifthly, the above-described processes according to the embodiment calculates score values of the extracted combinations of plant devices and control devices, using at least one of past records on destinations of delivery or each device, past records on operation of each plant, and past records on a source of delivery of each device as operational past records, and outputs the extracted combinations of plant devices and control devices in a descending order with respect to the score value. The processes according to the embodiment thus make it possible to easily execute a setting for a centred device in a plant by evaluating operational past records more effectively.

4-6. Effect 6

Sixthly, the above-described processes according to the embodiment output the extracted combinations of plant devices and control devices in a descending order with respect to the amount of operational past records, in an ascending order with respect to the time of operational past records, or in a descending order with respect to the evaluation on the operational past records. The processes according to the embodiment thus make it possible to easily execute a setting for a control device in a plant by reflecting a condition that the user requests more effectively.

System

The process procedure, control procedure, specific names, and information including various types of data and parameters that are presented in the description above and the drawings are changeable freely unless otherwise noted.

Each component of each device illustrated in the drawings is of a functional idea and is not necessarily configured physically as illustrated in the drawings. In other words, specific modes of distribution and integration of each device are not limited to those illustrated in the drawings. In other words, all or part thereof can be configured by being distributed or integrated functionally or physically in any unit according to various types of load and usage.

Furthermore, all or any part of each processing function implemented by each device can be realized by a CPU and a program that is analyzed and executed by the CPU or can be realized as hardware according to a wired logic.

Hardware

Figure 6:
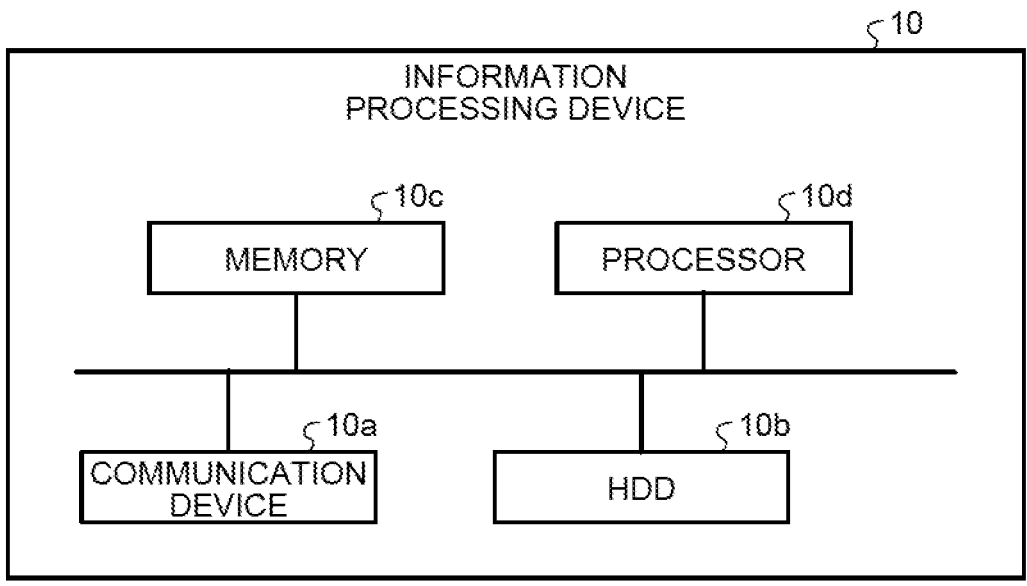
FIG. 6 is a diagram for describing a hardware configuration example.

A hardware configuration of the information processing device 10 will be described. IG. 6 is a diagram for describing a hardware configuration example. As illustrated in FIG. 6, the information processing device 10 includes a communication device 10a, a hard disk drive (HDD)) 10b, a memory 10c, and a processor 10d. They units illustrated in FIG. 6 are connected mutually via a bus, or the like.

The communication device 10a is a network interface card, or the like, and communicates with another server. The DD 10b stores a program that runs the functions illustrated in FIG. 2 and a DB.

Figure 2:
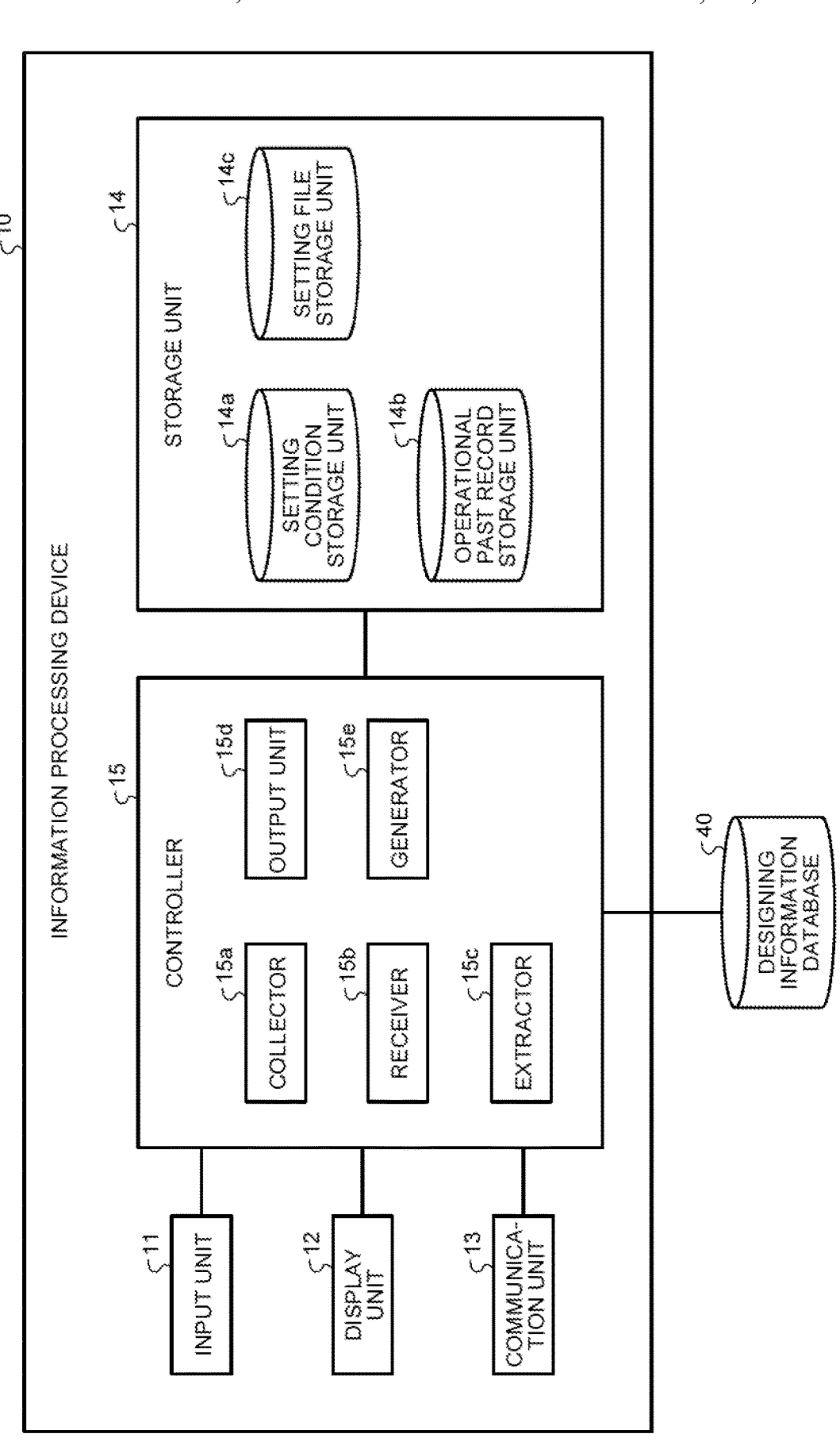
FIG. 2 is a block diagram illustrating a configuration example of an information processing device according to the embodiment.

The processor 10d reads the program that executes the same processing as that performed by each of the processors illustrated in FIG. 2 from the HDD 10b, or the like, and loads the program in the memory 10c, thereby running a process that executes each of the functions illustrated in FIG. 2, etc. For example, the process executes the same function as that of each processor that the information processing device 10 includes. Specifically, the processor 10d reads the program with the same functions as those of the collector 15a, the receiver 15b, the extractor 15c, the output unit 15d, the generator 15e, etc., from the HDD 10b, or the like. The processor 10d executes the process of executing the same processing as that performed by the collector 15a, the receiver 15b, the extractor 15c, the output unit 15d, the generator 15e, etc.

As described above, by reading and executing the program, the information processing device 10 runs as device that executes various types of processing methods. The information processing device 10 is also able to realize the same functions as those of the above-described embodiment by reading the above-described program from a recording medium using a medium reading device and executing the read program. Programs according to other embodiments are not limited to being executed by the information processing device 10. For example, the present disclosure is similarly applicable to the case where another computer or another server executes the program or where they execute the program cooperatively.

The program can be distributed via a network, such as the Internet. The program is recorded in a computer-readable recording medium, such as a hard disk, a flexible disk (FD), a CD-ROM, a magneto-optical disk (MO), or a digital versatile disc (DVD), and is read by a computer from the recording medium, so that the program can be executed.

According to the disclosure, there is an effect that it is possible to easily select devices to be used for a plant.

What is claimed is:

1. An information processing device comprising a non-transitory memory and a processor coupled to the non-transitory memory, wherein the non-transitory memory is configured to:

store a plurality of sets of designing information each on a combination of a plurality of plant devices that execute an operation in a plant and at least one control device that executes control on each of the plant devices; and store operational past records with respect to each of the combinations; and the processor is configured to:

extract, based on the designing information, the combinations that meet a designing condition on the plant;

calculate score values of the extracted combinations using, as the operational past records, at least one of past records on destinations of delivery of each device, past records on operation of each plant, past records on a source of delivery of each device, and output the combinations whose score values are equal to or larger than a given value; and execute a setting for the at least one control device contained in the combination by generating a setting file for the at least one control device contained in the combination that is selected by a user.

2. The information processing device according to claim 1, wherein the processor is further configured to receive at least one of a type of the plant and a type of the operation from a user as the designing condition.

3. The information processing device according to claim 1, wherein the processor is further configured to receive a type of the plant and a type of the operation from a user as the designing condition.

4. The information processing device according to claim 1, wherein the processor is further configured to:

collect the designing information from a website, a brochure or a specification of a source of delivery of the plant device or the control device and store the designing information in the memory; and extract the combinations that meet the designing condition from the designing information that the memory stores.

5. The information processing device according to claim 1, wherein the processor is further configured to generate a setting file that contains information enabling execution of at least one of communication, arithmetic processing and display that the plant device or the control device in the plant performs.

6. The information processing device according to claim 1, wherein the output unit outputs processor is further configured to output the extracted combinations in a descending order with respect to a amount of operational past records, in an ascending order with respect to a time of operational past records, or in a descending order with respect to evaluation.

7. An information processing method comprising:

keeping a plurality of sets of designing information each on a combination of a plurality of plant devices that execute an operation in a plant and at least one control device that executes control on each of the plant devices, keeping operational past records with respect to each of the combinations, extracting the combinations that meet a designing condition on the plant based on the designing information, calculating score values of the extracted combinations using, as the operational past records, at least one of past records on destinations of delivery of each device, past records on operation of each plant, past records on a source of delivery of each device, and outputting the combinations whose score values are equal to or larger than a given value, and executing a setting for the at least one control device contained in the combination by generating a setting file for the at least one control device contained in the combination that is selected by a user.

8. A non-transitory computer-readable recording medium having stored therein an information processing program that causes a computer to execute a process comprising:

keeping a plurality of sets of designing information each on a combination of a plurality of plant devices that execute an operation in a plant and at least one control device that executes control on each of the plant devices, keeping operational past records with respect to each of the combinations, extracting the combinations that meet a designing condition on the plant based on the designing information, calculating score values of the extracted combinations using, as the operational past records, at least one of past records on destinations of delivery of each device, past records on operation of each plant, past records on a source of delivery of each device, and outputting the combinations whose score values are equal to or larger than a given value, and executing a setting for the at least one control device contained in the combination by generating a setting file for the at least one control device contained in the combination that is selected by a user.

9. An information processing device comprising a non-transitory memory and a processor coupled to the non-transitory memory, wherein the non-transitory memory is configured to:

store a plurality of sets of designing information each on a combination of a plurality of plant devices that execute an operation in a plant and at least one control device that executes control on each of the plant devices; and store operational past records with respect to each of the combinations; and the processor is configured to:

extract, based on the designing information, the combinations that meet a designing condition on the plant; and outputs the extracted combinations based on the operational past records, wherein the processor is further configured to output the extracted combinations in a descending order with respect to a amount of operational past records, in an ascending order with respect to a time of operational past records, or in a descending order with respect to evaluation, and execute a setting for the at least one control device contained in the combination by generating a setting file for the at least one control device contained in the combination that is selected by a user.

* * * * *